July 13, 1937.  G. L. GRUNDMANN  2,086,615
HIGH FREQUENCY WAVE METER
Filed April 9, 1936  2 Sheets-Sheet 1

TO GRID

COUPLING TO SIGNAL
OF UNKNOWN FREQUENCY

Inventor
Gustave L. Grundmann
By
Attorney

Inventor
Gustave L. Grundmann

Patented July 13, 1937

2,086,615

UNITED STATES PATENT OFFICE 2,086,615

HIGH FREQUENCY WAVE METER

Gustave L. Grundmann, Westmont, N. J., assignor to Radio Corporation of America, a corporation of Delaware Application April 9, 1936, Serial No. 73,490

6 Claims. (Cl. 250—39)

This invention relates to wave meters. More specifically, this invention pertains to a device for measuring waves of ultra high frequencies.

In general, wave meters are combinations of inductors and capacitors, the values of which may be varied to render such combinations resonant to currents of definite frequencies. In these devices it is usually desirable to have the ratio of inductive reactance to resistance as high as possible thereby providing sharp resonant curves. At the shorter radio wave lengths very accurate measurements are required because a slight error in wave length corresponds to a very substantial error in frequency.

One object of this invention is found in the design of a precise ultra high frequency wave meter.

Another object is to provide an ultra high frequency wave meter in which the ratio of the inductive reactance to the resistance is high compared with conventional circuit values.

A still further object is to provide means in an ultra high frequency wave meter for minimizing the effects of variation in ambient temperature.

An additional object is to couple an indicating device to the wave meter without appreciably effecting the selectivity of the wave meter.

Figure 1:
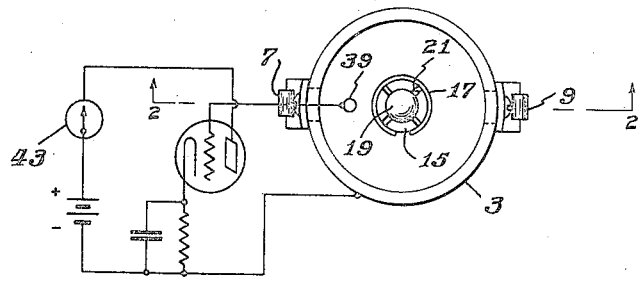
Figures 2, 2A:
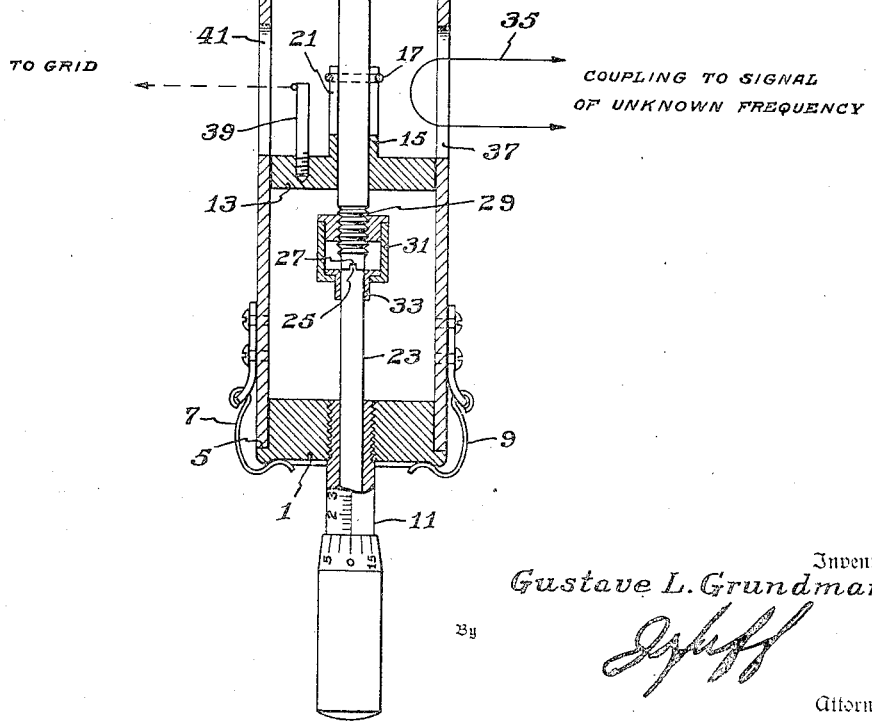
Figure 3:
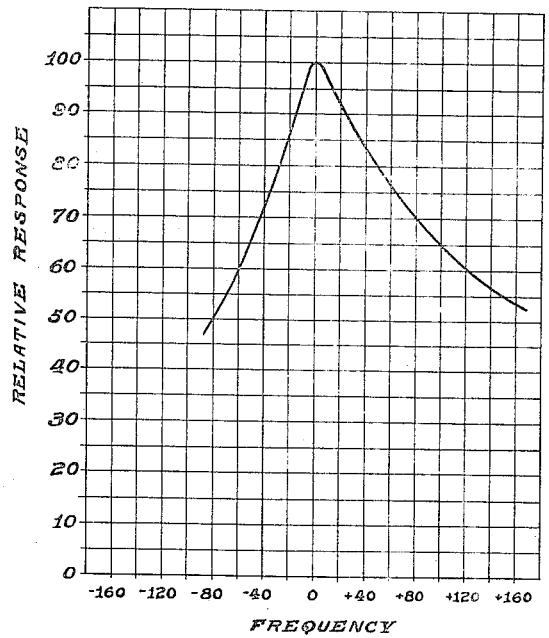
Figure 4:
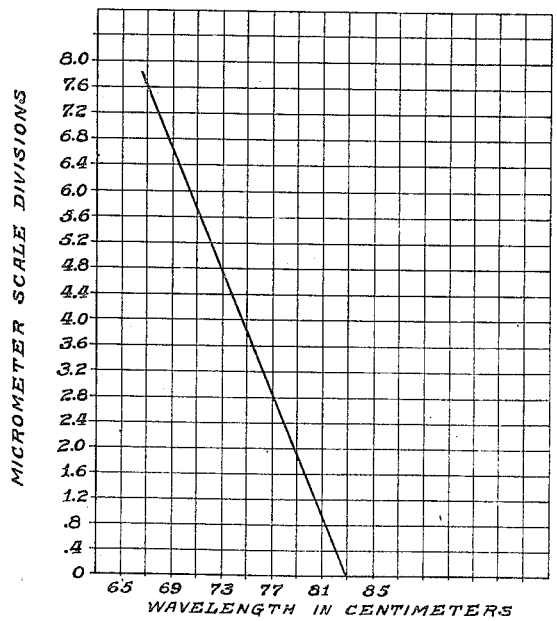

In the accompanying figures, Fig. 1 is a plan view of one embodiment of my invention, Fig. 2 is a sectional view taken along lines 2—2 of Fig. 1, Fig. 2A is an enlarged elevational view of the short circuiting member, which is represented in section in Fig. 2, Fig. 3 is a graph showing the relative response plotted against frequency in kilocycles off resonance of the wave meter embodying my invention, and Fig. 4 is a graph showing the calibration of the wave meter of this invention.

Referring to Figs. 1 and 2, an end member 1 is secured within a hollow cylindrical member 3. The end member 1 is accurately located by the shoulder 5 and firmly held in position by the spring clips 7, 9. A micrometer head 11 is threaded into the end member 1. A short circuiting member 13 is fastened intermediate the ends of the cylindrical member 3 by soldering, brazing, forced fit or the like. A slotted sleeve 15 extends from the center of the shorting member 13 toward the open end of the cylindrical member 3. A spring 17 of suitable metal surrounds the slotted sleeve.

A tuning rod 19 of substantially the same diameter as the internal diameter of the sleeve 13 is passed through the sleeve. The slots 21 and the spring 17 insure good electrical contact between the tuning rod and the sleeve. The lower end of the tuning rod engages the shaft 23 of the micrometer screw. This engagement must be securely and accurately made. I prefer to use a key 25 and key way 27 accurately machined in the micrometer screw and the lower end of the tuning rod. The key and key way are held in engagement by threading the tuning rod, and by a knurled nut 31 which engages this thread 29 and a shoulder member 33 on the micrometer screw. Turning the micrometer screw moves the tuning rod with respect to the short circuiting member and increases or decreases the length of the tuning rod disposed between the open end of the cylindrical member and the short circuiting member. The resonant wave length is approximately four times the tuning rod length.

The signal currents, whose frequency or wave length is to be measured, are induced in the resonant rod by inserting a loop 35 of wire carrying these currents through a small slot 37 in the cylindrical member 3. The coupling for the resonance indicator means consists in a small wire or rod 39 which is secured to the shorting member and located as shown. The free end of this coupling member 39 is connected through a slot 41 to the grid of a vacuum tube voltmeter 43, or other suitable voltage indicator.

If extreme accuracy is required, provision must be made to minimize the effects of ambient temperature changes. The use of invar steel greatly reduces the expansion or contraction of the several elements per degree temperature change as compared with brass or copper, for example. However, the use of invar steel will greatly increase the resistance of the circuits. This decreases the ratio of reactance to resistance and broadens the resonant peak. This difficulty may be overcome by silver, copper or similar low resistive metal plating the invar steel. Instead of using invar steel, the several elements, other than the micrometer, may be fabricated from metallized fused quartz. Since the fused quartz has a very low coefficient of expansion, the combination may be made effective by silver plating the quartz, thereby securing a good conductivity and low coefficient of expansion.

It should be understood that brass conductors and a steel micrometer have coefficients of expansion which are low enough to insure satisfactory calibration over the range of ambient temperatures usually encountered. In order that a range of wave lengths or frequencies may be covered, a series of tuning rods of varying lengths are employed. The detachable end member makes it easy to change the rods, which differ by slightly less than the total movement of the micrometer screw. Each of the several tuning rods is calibrated by inducing currents of known frequency through the coupling loop. The micrometer is adjusted until a maximum voltage is indicated on the vacuum tube voltmeter 43. The micrometer setting is recorded for such frequency. These measurements are repeated throughout a range of frequencies for each tuning rod. The frequencies, or wave length if desired, may be plotted in graph form against the micrometer scale readings.

The ratio of reactance to resistance of a concentric resonant line of the above described type is very much higher than a conventional circuit of lumped inductance, and capacity. The resonant curve of the wave meter increases in sharpness as the ratio of reactance to resistance, $$\frac{2\pi fL}{R}$$

is increased. By way of example, for frequencies in the order of 375 megacycles, the following dimensions may be used: inside diameter of hollow cylindrical member—2.8 centimeters, length of cylindrical member about 30 centimeters from shorting member to open end; tuning rod—diameter .8 centimeter and effective length 20 centimeters. The resonant curve of this circuit is shown in Fig. 3. The ratio $$\frac{2\pi fL}{R} =$$

approximately 3,000 for this circuit. The calibration curve is illustrated in Fig. 4.

Thus an ultra high frequency wave meter has been described in which a concentric line has been employed as the resonant circuit. The inner conductor or tuning rod is connected to a micrometer screw so that the effective resonant frequency may be varied. The tuning rod is coupled to a voltage operated indicator. The input coupling is through a small opening in the outer conductor, or hollow cylindrical member. In the preferred and most precise form provision is made for minimizing the effect of ambient temperature changes.

I claim as my invention:

1. A wave meter comprising a hollow cylindrical member including an end member and a short circuiting member, a micrometer screw including a scale located in said end member, a tuning rod member located within said cylindrical member and in conductive engagement with said short circuiting member, and means connecting said tuning rod member and said micrometer screw.

2. A wave meter comprising a hollow cylindrical member including an open end portion; a short circuiting member located intermediate the ends of said cylindrical member; an end member secured to one end of said cylindrical member; a micrometer screw member mounted on said end member; and a tuning rod secured to said micrometer screw member, engaging said short circuiting member, and coaxially arranged in said open end portion of the hollow cylindrical member, whereby the length of rod within said open end portion may be varied by movement of said micrometer screw.

3. A wave meter comprising a hollow cylindrical member including an open end portion; a short circuiting member located intermediate the ends of said cylindrical member; an end member demountably secured to one end of said cylindrical member; a micrometer screw member mounted on said end member and a tuning rod secured to said micrometer screw member, engaging said short circuiting member, and coaxially arranged in said open end portion of the hollow cylindrical member, whereby said end member, micrometer, and tuning rod may be removed from said cylindrical member.

4. A wave meter comprising a hollow cylindrical member, a short circuiting member located intermediate the ends of said cylindrical member and including a sleeve, a tuning rod slidably mounted within said sleeve, means for moving said rod with respect to said sleeve, a voltage indicating device, and means coupling said device and said tuning rod.

5. A wave meter comprising a hollow cylindrical member, a short circuiting member located intermediate the ends of said cylindrical member and including a sleeve, a tuning rod slidably mounted within said sleeve, means for moving said rod with respect to said sleeve, a voltage indicating device, a coupling device connected to said short circuiting member, and means connecting said voltage indicating device and said coupling member.

6. In a device of the character of claim 4 means for indicating the movement of said rod with respect to said sleeve.

GUSTAVE L. GRUNDMANN.